United States Patent [19]
Tanabe et al.

[11] 4,194,158
[45] Mar. 18, 1980

[54] INTEGRATED FRONT END CIRCUIT FOR VHF RECEIVER

[75] Inventors: Kenzo Tanabe; Masashi Kanno, both of Katano, Japan

[73] Assignee: Matsushita Electric Industrial Co., Ltd., Osaka, Japan

[21] Appl. No.: 849,959

[22] Filed: Nov. 9, 1977

[30] Foreign Application Priority Data

Nov. 15, 1976 [JP] Japan .................................. 51-137678
Nov. 15, 1976 [JP] Japan ............................ 51-153602[U]

[51] Int. Cl.$^2$ ............................................. H04B 1/28
[52] U.S. Cl. ..................................... 455/333; 455/343; 455/208
[58] Field of Search ............... 325/344, 346, 349, 416, 325/492, 493, 434, 318, 430, 451

[56] References Cited

U.S. PATENT DOCUMENTS

3,805,162  4/1974  Hoffman et al. ...................... 325/492

OTHER PUBLICATIONS

Rinderle et al., "Monolithically Integrated FM Front End with New Diode Tuning Concept," *IEEE Trans. on Consumer Electronics*, Ul.CE-21, No. 4, Nov. 1975, pp 320-332.

*Primary Examiner*—John C. Martin
*Attorney, Agent, or Firm*—Wenderoth, Lind & Ponack

[57] ABSTRACT

The present invention is an integrated front end circuit for a VHF receiver including a high frequency grounded base amplifier, a mixer having a differential type amplifier, a constant current type oscillator, and a bias circuit. In the mixer, a resistor is inserted between common emitters of the transistors of a differential amplifier and the collector of a constat current transistor driving the differential amplifier. In order to keep the oscillation frequency constant during a change in source voltage, there is provided a certain relation between the change in source voltage and the driving current of the oscillator by means of a bias circuit. The collectors and bases of the transistors used for the high frequency amplifier, the differential amplifier and the oscillator use the same D.C. potential. The integrated front end circuit of the invention may be used, for example, as the front end of an FM portable radio receiver, and it is very desirable for practical use because it realizes sure operation even at a low voltage.

5 Claims, 5 Drawing Figures

INTEGRATED FRONT END CIRCUIT FOR VHF RECEIVER

This invention relates to a front end circuit for a VHF receiver, and more particularly to an integrated front end circuit effectively used for e.g. a portable FM radio receiver.

In the prior art, few integrated front end circuits for VHF receivers are provided because of economic problems and technical problems, such as undesirable high frequency characteristics, of the integrated circuit. However, according to recent development of the integrated circuit, it has become possible to dissolve the conventional problems of cost and poor high frequency characteristics, and now there are many attempts to provide various integrated circuits for high frequency applications. Still, for a front end circuit used for a VHF receiver such as a portable FM radio receiver, there is not yet provided a suitable integrated circuit which can operate effectively under the conditions of a largely deviating and low source voltage such as in the portable FM radio receiver.

Therefore, an object of the present invention is to provide a novel and improved integrated front end circuit for a VHF receiver.

Another object of the present invention is to provide a novel integrated front end circuit having a mixer circuit operating well even for a large input signal, and being effectively used for a VHF receiver.

A further object of the present invention is to provide a novel integrated front end circuit having an oscillator circuit which has a stable oscillation frequency during deviation of the source voltage, and being effectively used for a VHF receiver.

A still further object of the present invention is to provide a novel and improved integrated front end circuit for a VHF receiver having better characteristics for large deviation of the source voltage even in the low voltage range.

These objects can be achieved by providing the integrated front end circuit for VHF receiver according to the present invention, which includes an input terminal for the VHF signal; a power source; a resonance tuning circuit; a high frequency amplifier employing a grounded base type transistor circuit, the emitter of the transistor being connected to the input terminal, the base of the transistor being connected to the power source and the collector of the transistor being connected to the power source through a coil of the resonance tuning circuit; an intermediate frequency transformer; a mixer consisting of a differential amplifier composed of a pair of first and second transistors, a first constant current transistor and a first resistor, the base of the first transistor, which is one input terminal of the differential amplifier, being connected to the collector of the transistor of the high frequency amplifier, the base of the second transistor, which is the other input terminal of the differential amplifier, being connected to the power source, the emitters of the first and second transistors being connected in common to collector of the first constant current transistor through the first resistor, the collector of the first transistor being connected to the power source, the collector of the second transistor being connected to the power source through a primary winding of the intermediate frequency transformer, and the emitter of the first constant current transistor being grounded; a tuning circuit for oscillation; first, second and third capacitors; a grounded base type transistor oscillating circuit consisting of an oscillation transistor and a second constant current transistor, the base of the oscillation transistor being connected to the power source, the collector of the oscillation transistor being connected to the power source through a coil of the tuning circuit for oscillation, and the emitter of the oscillation transistor being connected to the collector of the second constant current transistor so that the bias current to the oscillation transistor is provided from and controlled by the second constant current transistor, the emitter of the second constant current transistor being grounded, the collector of the oscillation transistor also being connected to the base of the first constant current transistor of the mixer through the first capacitor so as to provide an oscillation signal to the mixer, and the oscillation transistor and the second constant current transistor forming an oscillator together with the second capacitor connected between the collector and the emitter of said oscillation transistor and with the third capacitor connected between the emitter of the oscillation transistor and ground; and a transistor bias circuit including a transistor for a current mirror circuit and a second resistor, the bias circuit driving the first constant current transistor of the mixer and the second constant current transistor of said oscillating circuit according to operation of the current mirror circuit.

These and other objects and the features of the present invention will be apparent from consideration of the following detailed description of the invention accompanying with the attached drawings, in which.

Figure 1:
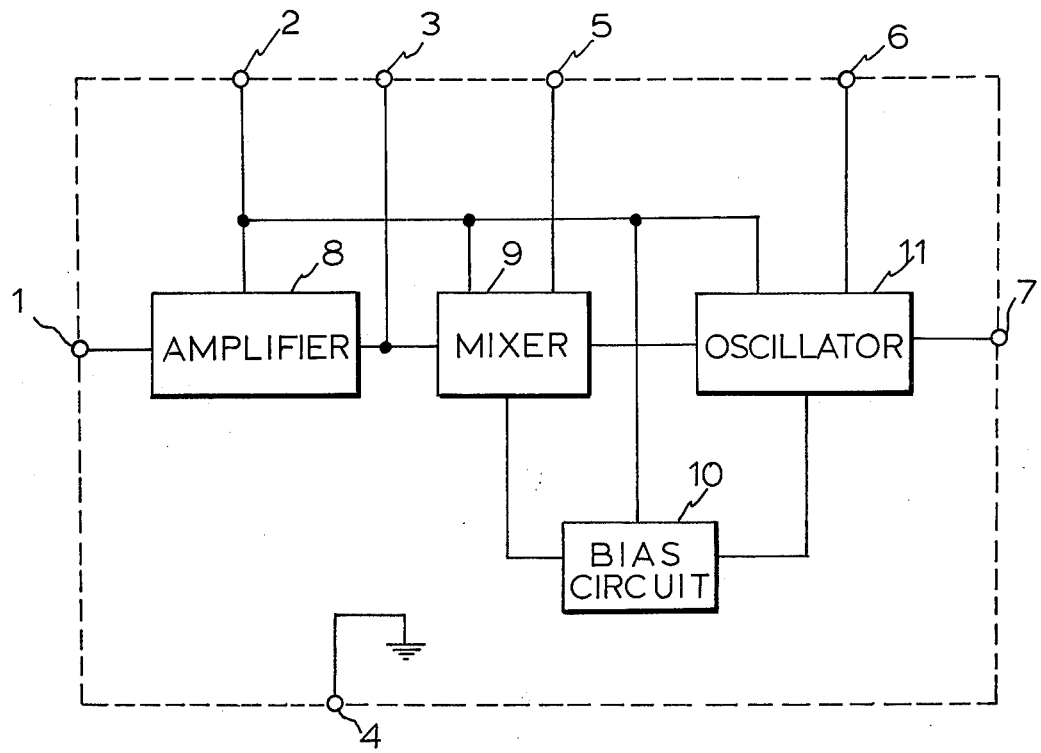
FIG. 1 is a block diagram of an integrated front end circuit for VHF receiver according to the present invention.

Now, referring to FIG. 1 showing the block diagram of the integrated frone end circuit for VHF receiver according to the invention, the circuits enclosed by a dotted line are all disposed in a single integrated circuit, and terminals designated by reference numerals 1 to 7 are provided to be connected to corresponding outer circuits, respectively. That is, a VHF signal is provided to an input terminal 1 of the front end circuit, and source voltage is applied to the circuit through a power source terminal 2. An outer tuning circuit is connected to a terminal 3, an IF (intermediate frequency) transformer is connected to a terminal 5, and a tuning circuit for oscillation is connected to a terminal 6, respectively. The front end circuit is grounded through a ground terminal 4. And, a feedback signal for oscillation is provided to a terminal 7. The front end output is provided at the secondary winding of the IF transformer connected to the terminal 5.

The operation of the front end circuit of FIG. 1 is as follows. The VHF signal applied to the input terminal 1 is selectively amplified by a high frequency transistor amplifier 8 of base-grounded type and the tuning circuit connected to the terminal 3, and the amplified signal is provided to a mixer 9 of differential amplifier type. On the other hand, a local oscillation signal from an oscillator 11 of constant current type is provided to the mixer 9, and then IF output signal is provided out from the secondary winding of the IF transformer. A bias circuit 10 provides DC bias voltage to the mixer 9 and the oscillator 11. This bias circuit 10 acts an important role in cooperation with the oscillator 11 for the front end circuit of the invention, as described hereinafter. The obtained IF signal as described above is then processed in turn by an IF amplifier, a detector and an audio signal amplifier in the following stages. Since the configuration of these following circuits and the operations thereof are the similar to those of conventional design and are not the substance of the present invention, descriptions thereof are omitted herewith for simplification.

Figure 2:
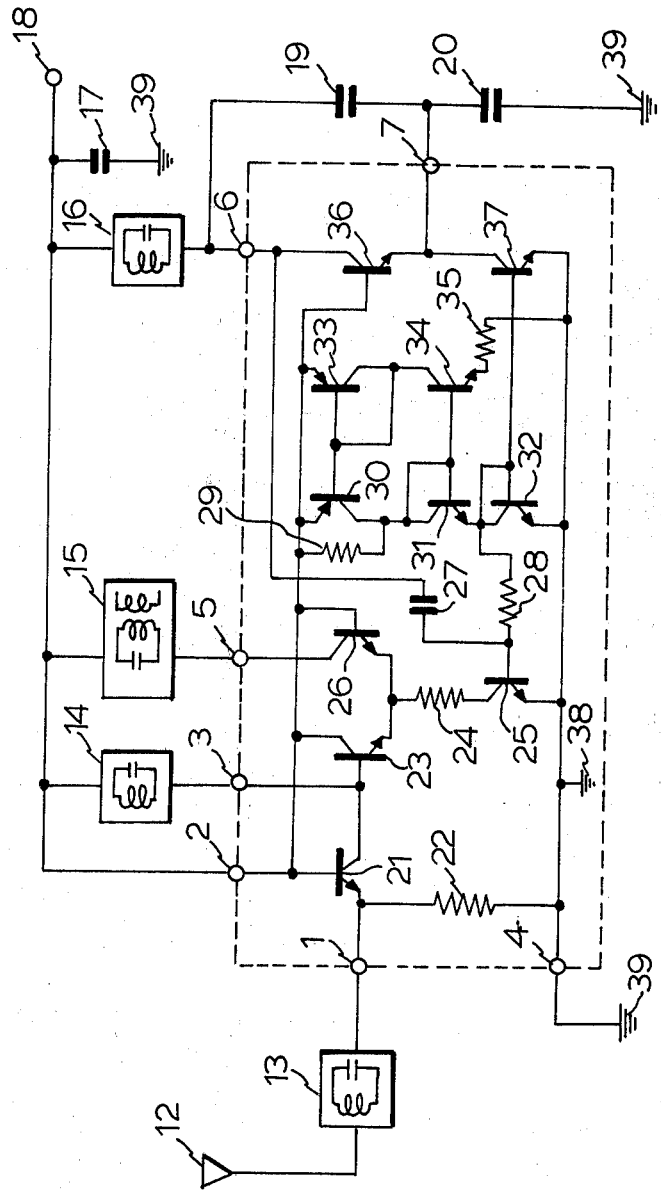
FIG. 2 is a circuit configuration of an embodiment of the block diagram of FIG. 1.

FIG. 2 shows a circuit configuration of an embodiment of the block diagram of FIG. 1, together with an illustration of the connection to the external circuits through the respective terminals. In FIG. 2, the parts designated by the same referential numerals as those of FIG. 1 are the same as those of FIG. 1.

In the circuit of FIG. 2, a signal from antenna 12 is applied to the terminal 1 through an input tuning circuit 13. A transistor 21 and a resistor 22 correspond to the grounded base high frequency transistor amplifier 8, and they form a selective amplifier together with a tuning circuit 14. Transistors 23, 25 and 26 and a resistor 24 form the differential type amplifier mixer 9 of FIG. 1. The base of the transistor 25 is biased by means of a resistor 28 and a transistor 32 of a current mirror circuit described hereinafter. A signal from the oscillator 11 is provided to the mixer through a capacitor 27. The resistor 24 is peculiar to this integrated front end circuit of the invention. It has the function of reducing the influence of the VHF signal applied to the input terminal 1 on the oscillator 11 through the capacitance between the collector and the base of the transistor 25 and the capacitor 27. Practically, the desirable resistance value of the resistor 24 is several hundred ohms. By insertion of the resistor 24, when this integrated circuit is used as a front end of an FM receiver the AM suppression characteristic thereof at a large input signal level can be improved.

An IF transformer 15 is connected to the terminal 5 and the front end output is provided at the secondary winding of the IF transformer 15. Transistors 36 and 37 correspond to the constant current type oscillator 11 shown in FIG. 1, and they form a Colpitts type oscillator together with a tuning circuit 16 connected to the terminal 6 and capacitors 19 and 20, which provide feedback, connected to the terminal 7. A bias current is provided to the oscillation transistor 36 from the transistor 37 which is driven by the current mirror Miller transistor 32 described above.

Transistors 30, 31, 32, 33 and 34 and resistors 29 and 35 correspond to the bias circuit 10 shown in FIG. 1. The transistors 30 and 33 of PNP type act as a current mirror circuit. Further, as described above, the transistor 25 of the mixer 9 and the transistor 37 of the oscillator 11 act as a current mirror circuit together with the transistor 32 of the bias circuit 10. The voltage of the emitter of transistor 34 is nearly equal to the voltage at the emitter of transistor 31. This voltage is equal to the voltage between the base and the emitter of transistor 32 because the base-collector junction of transistor 32 is shorted. Therefore, the bias current of the transistors 33 and 34 is nearly equal to the ratio of the voltage between the base and emitter of the transistor 32 and the resistance of the resistor 35. The resistor 29 is inserted so as to provide an auxiliary current to the transistors 31 and 32, with the magnitude of that auxiliary current adjusted according to a change in the source voltage. Since this auxiliary current is also provided to the transistors 25 and 37 through the transistor 32 of current mirror circuit, the currents flowing to the transistors 25 and 37 change according to a change in the source voltage. As one of the features of the front end circuit of this invention, it is arranged that that auxiliary current is provided to the oscillation transistor 36 through the transistor 37, as described hereinafter with reference to FIGS. 3 and 4.

In FIG. 2, 18 and 39 are the power source terminal and the grounded terminal, respectively. The integrated front end circuit of the invention is disposed on a substrate 38 of an integrated circuit chip. A capacitor 17 is provided for decoupling.

Figure 3:
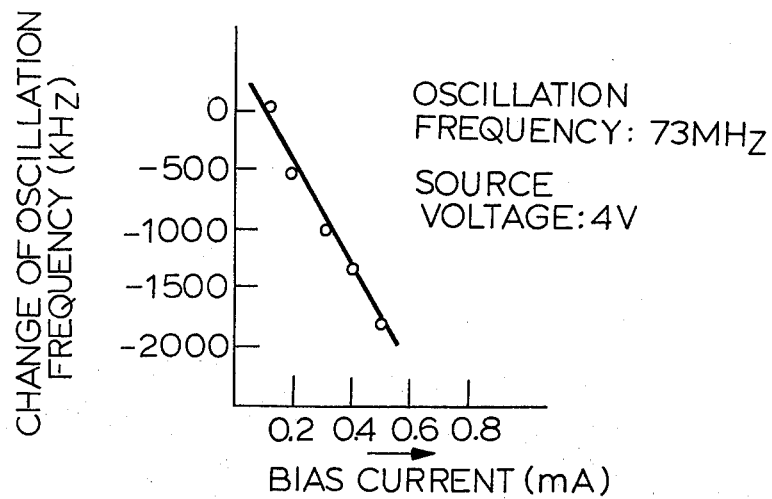
FIGS. 3 and 4 are graphs showing characteristics of oscillation frequency of an oscillator used in the circuit of FIG. 2 for change of bias current and source voltage, respectively.

The colpitts type oscillator is composed of the transistors 36 and 37, the tuning circuit 16 and the oscillation feedback capacitors 19 and 20 shown in FIG. 2. When the bias current (collector current) of the transistor 36 is changed by changing the base bias voltage of the transistor 37 with a constant source voltage, the oscillation frequency changes as shown in FIG. 3. On the other hand, in the same oscillator, when the source voltage is changed and the bias current (collector current) of the transistor 36 is kept constant by changing the base bias voltage of the transistor 37 according to the change of the source voltage, the oscillation frequency changes as shown in FIG. 4.

Figure 4:
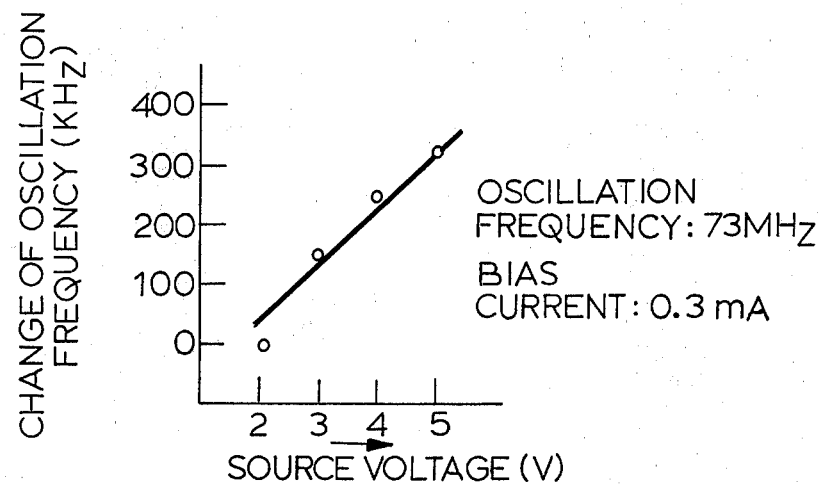

From FIGS. 3 and 4, it is observed that the oscillation frequency of this oscillator changes with a rate of about $-4$ MHz/mA for a change of the bias current, and with a rate of about 90 kHz/V for a change of the source voltage. The reason why the oscillator has the characteristic of FIG. 3 is due to the dependence of the base-emitter capacitance of the oscillation transistor 36 upon the emitter current thereof, and the reason why the oscillator has the characteristic of FIG. 4 is due to voltage dependence of the capacitance between the collector of the oscillation transistor 36 and the substrate, the capacitance between the collector of the constant current transistor 37 and the substrate, and the collector-emitter capacitance of the transistor 37. From the facts described above, the change $\Delta f$ of the oscillation frequency for the change $\Delta V$ of the source voltage and the change $\Delta I$ of the bias current is expressed as follows:

$$\Delta f = k_1 \Delta V + k_2 \Delta I \tag{1}$$

wherein $k_1$ means the degree of influence of the change of the source voltage on the change of the oscillation frequency at the constant bias current of the oscillation transistor, i.e. $k_1$(Hz/V); and $k_2$ means the degree of influence of the change of the bias current on the change of the oscillation frequency at the constant source voltage, i.e. $k_2$(Hz/A).

According to the present invention, it is arranged that the oscillation frequency of the oscillator shown in FIG. 2 can be kept constant even during a change of the source voltage based on the equation (1). That is, in order to make $\Delta f$ of the equation zero, the relation between $\Delta V$ and $\Delta I$ of the equation (1) is arranged as follows in the invention:

$$\Delta I / \Delta V = -k_1 / k_2 \tag{2}$$

For the example shown in FIGS. 3 and 4, the value of the equation (2) becomes 0.0225 mA/V. The resistor 29 of the bias circuit shown in FIG. 2 and described above is inserted so as to provide the relation of the equation (2) to the oscillator. For the example shown in FIGS. 3 and 4, it is understood that the suitable value of the resistor 29 is about 44 kΩ.

Although the auxiliary current owing to the resistor 29 is also provided to the transistor 25 by the current mirror action of the transistors 32 and 25, and so the bias current of the mixer is also changed according to change of the source voltage, it can be considered that the mixer is operated with a nearly constant current because that auxiliary current is small enough when compared with the main current.

Figure 2A:
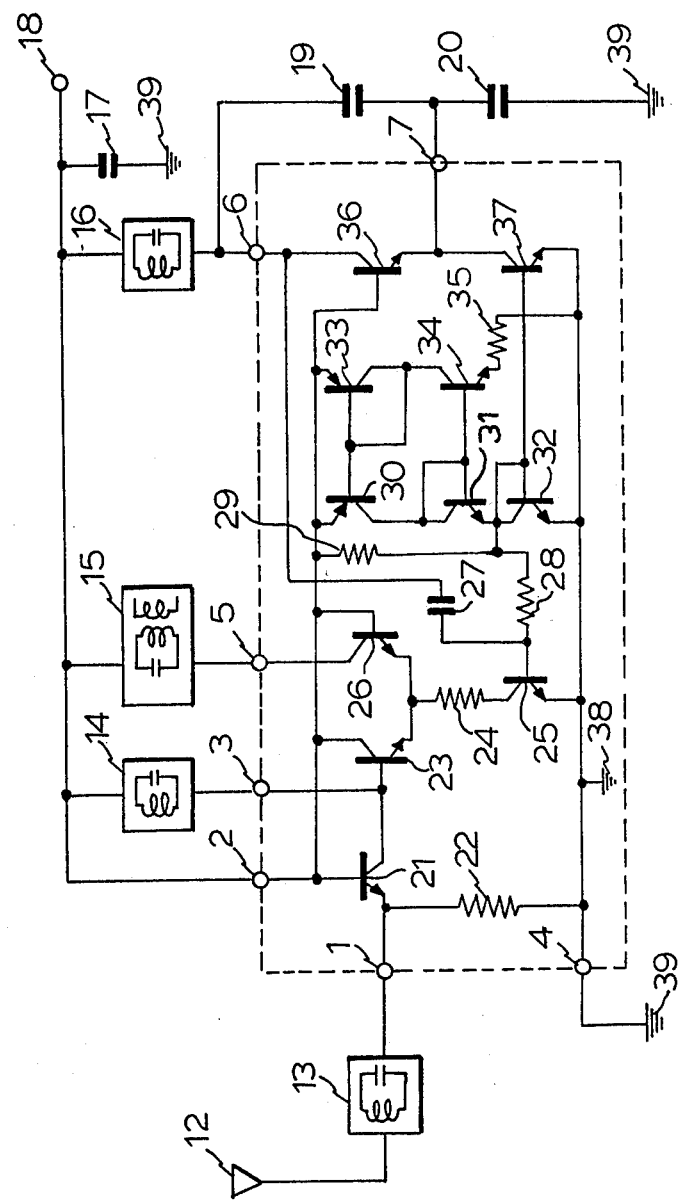
FIG. 2a is a circuit configuration similar to that illustrated in FIG. 2 illustrating an alternative connection of the bias circuit.

The same effect of the invention can be provided when the resistor 29 of the same resistance value is connected between the power source and the collector of the transistor 32 as illustrated in FIG. 2a, instead of connecting it between the power source and collector of the transistor 30, as means for providing the change of the bias current for the change of the source voltage, as the shown in the equation (2), to the oscillator.

As described in detail hereinbefore, in the integrated front end circuit according to this invention, there is realized a mixer highly stable for a large input signal level and an oscillator highly stable for a change of the source voltage. Further, since the collector and the base of the transistors of the bias circuit are operated at the same DC potential, the front end circuit of the invention can be operated well even at a low voltage. Therefore, it is very desirable for use as a front end circuit of a portable receiver.

What is claimed is:

1. A front end circuit for a VHF receiver comprising: an input terminal for a VHF signal; a power source; a resonance tuning circuit having a coil connected at one end thereof to said power source; a high frequency amplifier having a grounded base transistor, the emitter of said grounded base transistor being connected to said input terminal, the base of said grounded base transistor being connected to said power source and the collector of said grounded base transistor being connected to said power source through said coil of said resonance tuning circuit; an intermediate frequency transformer having a primary winding connected at one end thereof to said power source and a secondary winding; a mixer consisting of a differential amplifier composed of first and second transistors, a first constant current transistor and a first resistor, the base of said first transistor, which is one input terminal of said differential amplifier, being connected to the collector of said grounded base transistor of said high frequency amplifier, the base of said second transistor, which is the other input terminal of said differential amplifier, being connected to said power source, the emitters of said first and second transistors being connected in common to the collector of said first constant current transistor through said first resistor, the collector of said first transistor being connected to said power source, the collector of said second transistor being connected to said power source through said primary winding of said intermediate frequency transformer, and the emitter of said first constant current transistor being grounded; a tuning circuit for oscillation having a coil connected at one end thereof to said power source; first, second and third capacitors; a grounded base type transistor oscillating circuit consisting of an oscillation transistor, a second constant current transistor, the base of said oscillation transistor being connected to said power source, the collector of said oscillation transistor being connected to said power source through said coil of said tuning circuit for oscillation, and the emitter of said oscillation transistor being connected to the collector of said second constant current transistor so that bias current to said oscillation transistor is provided from and controlled by said second constant current transistor, the emitter of said second constant current transistor being grounded, the collector of said oscillation transistor being also connected to the base of said first constant current transistor of said mixer through said first capacitor for providing an oscillation signal to said mixer, said second capacitor being connected between the collector and the emitter of said oscillation transistor and said third capacitor being connected between the emitter of said oscillation transistor and the ground; and a transistor bias circuit including a current mirror transistor and a second resistor, said bias circuit driving said first constant current transistor of said mixer and said second constant current transistor of said oscillating circuit according to operation of a current mirror circuit.

2. A front end circuit for a VHF receiver as defined in claim 1, wherein said input terminal, said high frequency amplifier, said mixer, said first capacitor, said oscillating circuit, and said bias circuit are all disposed in a single integrated circuit chip.

3. A front end circuit for a VHF receiver as defined in claim 2, wherein said transistor bias circuit comprises means for causing a change of the bias current to said oscillation transistor due to a change of the source voltage to be $(-k_1/k_2)$ by means of said second resistor, wherein $k_1(Hz/V)$ is the degree of change of the oscillation frequency of said oscillation transistor for a change of the source voltage at a constant bias current thereto and $k_2(Hz/Amp)$ is a degree of change of the oscillation frequency of said oscillation transistor for a change of the bias current thereto at a constant source voltage.

4. A front end circuit for a VHF receiver as defined in claim 2, wherein said bias circuit comprises: first and second PNP transistors; first, second and third PNP transistors; and said second and a third resistors; the emitters of said first and second PNP transistors being connected to said power source, the bases of said first and second PNP transistors and the collector of said second PNP transistor being connected in common, and the collector of said first PNP transistor being connected to the collector of said first NPN transistor; the base of said first NPN transistor being connected directly to the collector thereof and the emitter of said first NPN transistor being connected to the collector of said second NPN transistor; the base of said second NPN transistor being connected directly to the collector thereof and the emitter of said second NPN transistor being grounded; the base of said third NPN transistor being connected to the base of said first NPN transistor, the emitter of said third NPN transistor being grounded through said third resistor, and the collector of said third NPN transistor being connected to the collector of said second PNP transistor; said second resistor being connected between the power source and the collector of said first PNP transistor; wherein said second NPN transistor is used as said current mirror transistor for current mirror circuit, and the collector of said second NPN transistor is made an output terminal of said bias circuit for driving said constant current transistors of said mixer and of said ocsillating circuit.

5. A front end circuit for a VHF receiver as defined in claim 2, wherein said bias circuit comprises: first and second PNP transistors; first, second and third NPN transistors; and said second and a third resistors; the emitters of said first and second PNP transistors being connected to said power source, the bases of said first and second PNP transistors and the collector of said second PNP transistor being connected in common, and the collector of said first PNP transistor being connected to the collector of said first PNP transistor; the base of said first NPN transistor being connected directly to the collector thereof and the emitter of said first NPN transistor being connected to the collector of said second NPN transistor; the base of said second NPN transistor being connected directly to the collector thereof and the emitter of said second NPN transistor being grounded; the base of said third NPN transistor being connected to the base of said first NPN transistor, the emitter of said third NPN transistor being grounded through said third resistor, and the collector of said third NPN transistor being connected to the collector of said second PNP transistor; said second resistor being connected between the power source and the collector of said second NPN transistor; wherein said second NPN transistor is used as said current mirror transistor for current mirror circuit, and the collector of said second NPN transistor is made an output terminal of said bias circuit for driving said constant current transistors of said mixer and of said oscillating circuit.

* * * * *